(12) United States Patent
Sirianni

(10) Patent No.: US 10,434,423 B2
(45) Date of Patent: Oct. 8, 2019

(54) FANTASY ALERT REPLACEMENT OF PLAYERS

(71) Applicant: Pete Sirianni, Hermitage, PA (US)

(72) Inventor: Pete Sirianni, Hermitage, PA (US)

( * ) Notice: Subject to any disclaimer, the term of this patent is extended or adjusted under 35 U.S.C. 154(b) by 556 days.

(21) Appl. No.: 15/097,890

(22) Filed: Apr. 13, 2016

(65) Prior Publication Data

US 2016/0310848 A1    Oct. 27, 2016

Related U.S. Application Data

(60) Provisional application No. 62/150,370, filed on Apr. 21, 2015.

(51) Int. Cl.
*A63F 13/828* (2014.01)
*A63F 13/35* (2014.01)

(52) U.S. Cl.
CPC ............ *A63F 13/828* (2014.09); *A63F 13/35* (2014.09)

(58) Field of Classification Search
CPC .............................. A63F 13/828; A63F 13/35
See application file for complete search history.

(56) References Cited

U.S. PATENT DOCUMENTS

| 2013/0079073 A1* | 3/2013 | Sharifi | A63F 13/10 463/3 |
| 2014/0163705 A1* | 6/2014 | Moller | A63F 13/00 700/92 |

* cited by examiner

*Primary Examiner* — Pierre E Elisca
(74) *Attorney, Agent, or Firm* — Thomas | Horstemeyer, LLP

(57) ABSTRACT

Disclosed are various embodiments for preventing a patron from starting an inactive player in a fantasy sports system. An application program is executed on one or more computing devices. The application obtains information from a fantasy sports system about a patron's current roster and monitors sports players on the patron's roster to determine if any become inactive. The patron is notified if a player becomes inactive and can choose to substitute an alternative sports player.

12 Claims, 7 Drawing Sheets

| | 203 | 206 | 209 | 212 | 215 | |
|---|---|---|---|---|---|---|
| | PG | Russell Westbrook | 48.9 | 48 | LAC@OKC | $13,300 — 218A |
| | PG | Chris Paul — 221 | 40.8 | 64 | LAC@OKC | $10,500 — 218B |
| | PG | Stephen Curry | 42.4 | 61 | DET@GS | $10,300 — 218C |
| | PG | Damian Lillard | 37.1 | 61 | HOU@POR | $8,700 — 218D |
| | PG | Ricky Rubio | 32.7 | 19 | MIN@PHO | $8,200 — 218E |
| | PG | Kemba Walker — 221 | 33.4 | 42 | SAC@CHA | $8,100 — 218F |
| | PG | Michael Carter-Williams | 32 | 48 | ORL@MIL | $7,800 — 218G |
| | PG | Ty Lawson | 34.7 | 61 | ATL@DEN | $7,500 — 218H |
| | PG | Mo Williams | 26.4 | 51 | SAC@CHA | $7,400 — 218I |
| | PG | Isaiah Thomas — 221 | 25.2 | 56 | MEM@BOS | $7,300 — 218J |
| | PG | Jeff Teague | 32.2 | 58 | ATL@DEN | $7,100 — 218K |
| | PG | Reggie Jackson | 24.9 | 58 | DET@GS | $6,900 — 218L |

FANTASY ALERT REPLACEMENT OF PLAYERS

CLAIM OF PRIORITY

This application claims the benefit of and priority to U.S. provisional application No. 62/150,370, filed Apr. 21, 2015, which is incorporated herein by reference in its entirety.

FIELD OF INVENTION

The present disclosure generally relates to fantasy sports games, and more particularly, to any type of fantasy match, such as a sports fantasy match.

BACKGROUND

A fantasy match can be operated by a fantasy site on the Internet utilizing a server based system, like FanDuel, Yahoo Fantasy Sports, and ESPN Fantasy Games, among other fantasy sites. Fantasy sites allow patrons to compete against friends or random patrons either for free or with a bet to win money based on performance of the patron. The competition can occur a single time or can be recurring, for example, a league of multiple competitions. In some modes, patrons are given a fixed size pool of in-game money, referred to as a salary cap, and the patrons can select players participating in a sporting event, with each player being assigned an in-game monetary cost. A cost can be associated with each of the sports players participating in a game or collection of games. Each patron can select sports players from the pool of participating sports players, where each selected sports player cost is counted against a patron's in-game money. A sports player that is selected for a patron's team can later become inactive or get injured and therefore not play in the game. The sports player can become inactive as near as minutes or seconds prior to the start of the game. On some fantasy sites, rosters of sports players cannot be modified after the start of the game. As such, it would be desirable to have some means for handling when a sports player becomes inactive subsequent to being added to a patron's roster.

SUMMARY

Disclosed are various embodiments for preventing a patron from starting an inactive player in a fantasy sports system. An application program is executed on one or more computing devices. The application obtains information from a fantasy sports system about a patron's current roster and monitors sports players on the patron's roster to determine if any player becomes inactive. The patron is notified if a player becomes inactive and can choose to substitute an alternative sports player.

These and other aspects, objects, features, and embodiments will become apparent to a person of ordinary skill in the art upon consideration of the following detailed description of illustrative embodiments exemplifying the best mode presently understood.

BRIEF DESCRIPTION OF THE DRAWINGS

For a more complete understanding of the embodiments and the advantages thereof, reference is now made to the following description, in conjunction with the accompanying figures briefly described as follows:

FIG. 2 illustrates a listing of sports player costs according to various example embodiments;

FIG. 3 illustrates a roster of a patron according to various example embodiments;

Figure 1:
FIG. 1 illustrates a roster of a patron according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments.

The embodiments described herein are not limited in application to the examples set forth in the following description. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect connections and couplings. In addition, the terms "connected" and "coupled" are not restricted to physical or mechanical connections or couplings. As used herein the terms "machine," "client," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, a general description of exemplary embodiments of a system and its components are provided, followed by a discussion of the operation of the same.

FIG. 1 illustrates an example roster 100 of a patron according to various example embodiments. The roster 100 can include multiple sports player slots 103A-103I. Some sports player slots can be specific to a position, for example a Basketball roster is shown with sports player slots 103A and 103B reserved for Point Guards, player slots 103C and 103D reserved for Shooting Guards, player slots 103E and 103F reserved for Shooting Forwards, player slots 103G and 103H reserved for Power Forwards, and player slot 103I reserved for Centers. In some embodiments, flexible player slots (not shown) can also be utilized whereas a player from any position or from preconfigured positions can be utilized. A patron can choose a sports player for a sports player slot from the population of sports players participating in a preconfigured one or more sporting events where the chosen sports player meets the requirements of the sports player slot. In some embodiments, once a sports player is chosen for a slot, the sports player's name 106 and sports player's contest details 109 can be shown on the roster.

FIG. 2 illustrates a listing of sports players 200 according to various example embodiments. The listing of sports players 200 can include a sports player position 203, sports player name 206, average fantasy points per game (FPPG) 209, games played 212, sports contest under consideration 215, and in-game money cost for sports player 218A-218L. The listing of sports players can correspond to a single fantasy sports event, and a second listing of sports players can be generated for a second fantasy sports event. The second listing of sports players can include all the same sports players/sports player names 206, but have different average fantasy points per game (FPPG) 209, games played 212, sports contest under consideration 215, and in-game money cost for sports player 218A-218L. In some embodiments, the listing of sports players 200 can also include information about a likelihood a sports player will play in the sports contest under consideration 215, for example, the letters GTD, meaning game time decision, can be affixed after a sports players name if the decision on the sports player playing in the contest has not yet been made. The in-game money cost for each sports player can be based on numerous factors such as past statistics, a comparison of older play to more current play, frequency of missing games, record of current team, frequency of patrons selecting the player, and roster considerations for the sports player team, among other options. A patron can be given a fixed salary cap to spend on sports players where each sports player costs the corresponding in-game money cost for the selected sports player. When a patron does not have enough salary cap money left, the patron cannot select a sports player. In some embodiments, the same sports player can be selected by multiple patrons during the same contest period. In other embodiments, the sports player can only be selected by one patron during the same contest period.

FIG. 3 illustrates an alternative embodiment of roster 100, shown as roster 100B, according to various embodiments of the present disclosure. The roster 100B includes sports player slots such as sports player slot 303A, salary of player 309, information regarding number of patrons with the sports player on their roster 312, fantasy score during the sports contest 315, total patron score 306, position of patron 300. The sports player slot 303A can be a sports player slot 103A-103I as shown in FIG. 1. As shown in FIG. 3, the patron can have a salary cap of in-game money available to spend selecting sports players for a roster. Adding a sports player to the roster "costs" the patron according to the salary of the player 309. In one embodiment, the salary cap for a patron can be $60,000 and the cost for sports players on the patron's roster 100B can be $9,400, $9,200, $4,400, $6,000, $3,800, $7,200, $4,700, $7,100, and $8,200.

Figure 4:
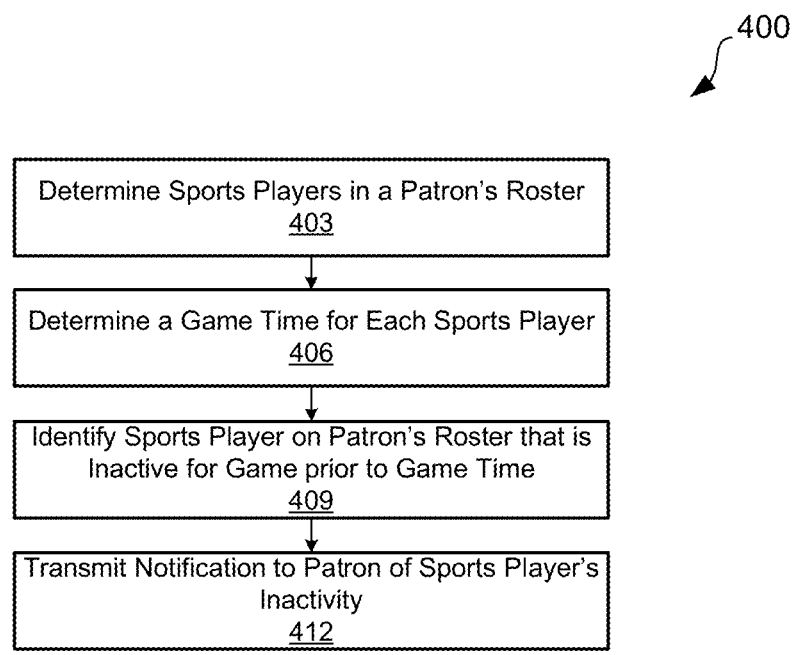
FIG. 4 illustrates an example flowchart of certain functionality implemented by portions of an application executed in a computing environment of FIG. 7 according to various embodiments of the present disclosure.

Referring next to FIG. 4, shown is a flowchart 400 that provides one example of the operation of a portion of a fantasy alert and replacement of players application executed on computing architecture 700 (FIG. 7) according to various embodiments. It is understood that the flowchart 400 of FIG. 4 provides merely an example of the many different types of functional arrangements that may be employed to implement the operation of the portion of the fantasy alert and replacement of players as described herein. As an alternative, the flowchart 400 of FIG. 4 may be viewed as depicting an example of steps of a method implemented in a computing environment including computing architecture 700 (FIG. 7) according to one or more embodiments.

In step 404, the process involves determining sports players in a patron's roster. For example, a patron can provide login credentials to the application for one or more third party fantasy sites and the application can obtain information about any matches, contests, or leagues the patron is involved in from the one or more fantasy sites. The information can comprise one or more single fantasy sports matches, where each of the one or more single fantasy sports matches corresponds to a different day of the week or a different week. The information can also comprise different rosters, monetary costs, and other game specific information for each of the one or more single fantasy sports matches. In some embodiments, a patron can grant permission to the application to access fantasy data associated with a third party smartphone app or website. The fantasy data can include, among other things, a listing of sports players associated with a patron's roster for a particular fantasy sports event. In step 406, the process can involve determining a starting time for each contest in which sports players compete associated with the fantasy sports event. For example, the application can query one or more third party data sources to determine the next game time for a sports player or sports team. In some embodiments, the start time for the contest is obtained from the one or more third party fantasy sites when the fantasy information is obtained.

In step 409, the process involves identifying one or more sports players on the patron's roster that become inactive prior to the start of the game. For example, a sports player, such as Derrick Rose, could injure his knee walking into the stadium to play the game. Alternatively, a sports player may decide not to play because the player is sore, tired, or just want to sit out a game. The application can connect to a third party service and obtain current status information about whether the sports player will participate in a contest for one or more sports players on a patron's roster. In some embodiments, the application obtains the status for all sports players from a given sport or all sports players from a given sport playing during a time window associated with the fantasy sports event. For example, the application can obtain data indicating the status for each NBA player in the NBA scheduled to play on a Thursday night. The application can use the data to identify a sports player on the patron's roster that will not be playing, and therefore, award the patron zero points. The application can also determine that a player is injured for multiple games and identify which rosters that patron is on for future events as well. For example, an injured player may be expected to miss 6 months due to an ACL tear, and a patron may not have started the injured player on the patron's Thursday roster and Saturday roster, but did start the injured player on the patron's Friday roster and Sunday roster. The application can identify that the injured player is inactive for the Friday and Sunday game where the injured player is on the patron's rosters for those days.

In step 412, the process involves transmitting a notification to the patron of the inactivity of the identified sports player. For example, a patron may have signed up on a third party site for a Thursday night NBA fantasy contest, wherein the patron with the most points on a roster wins a monetary award. The application can obtain the roster from the third party site, identify an NBA player that is inactive prior to the start of the game, and transmit a notification to the patron prior to the start of the game to inform the patron of the inactivity. In some embodiments, in response to receiving the notification, the patron can login to the third party site and exchange another sports player with the inactive sports player. In other embodiments, the notification can include a list of alternative available sports players that the patron has the salary cap room for. As a non-limiting example, if the inactive sports player had a salary value of $10,000, but the patron only spent $59,800 of an available $60,000, the application can identify sports players with salary values of $10,200 or less.

Figure 5:
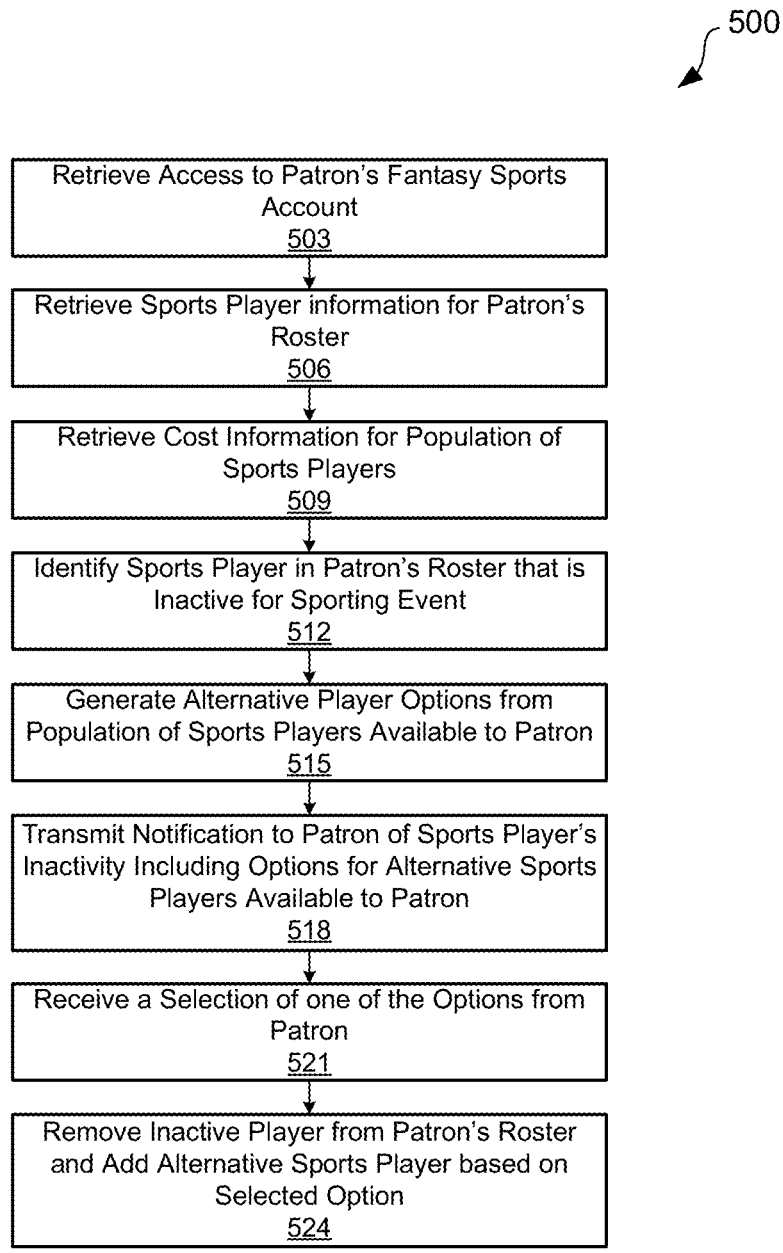
FIG. 5 illustrates an example flowchart of certain functionality implemented by portions of an application executed in a computing environment of FIG. 7 according to various embodiments of the present disclosure.

Referring next to FIG. 5, shown is a flowchart 500 that provides one example of the operation of a portion of a fantasy alert and replacement of players application executed on computing architecture 700 (FIG. 7) according to various embodiments. It is understood that the flowchart 500 of FIG. 5 provides merely an example of the many different types of functional arrangements that may be employed to implement the operation of the portion of the fantasy alert and replacement of players as described herein. As an alternative, the flowchart 500 of FIG. 5 may be viewed as depicting an example of steps of a method implemented in a computing environment including computing architecture 700 (FIG. 7) according to one or more embodiments.

In step 503, the process involves retrieving access to a patron's fantasy sports account. For example, the application can request credentials from a patron for a third party site and connect to the third party site using those credentials. In other embodiments, the application can be granted access by the patron to a smartphone app or a website. In step 506, the process involves retrieving the sports player information for patron's roster. For example, the application can query the third party system utilizing the patron's credentials to obtain a listing of fantasy contests associated with the patron's account. The application can also query for a roster of sports players for each of the fantasy contests associated with the patrons account and for corresponding salary caps for each fantasy contest. In some embodiments, rather than obtaining credentials or permission to access the information, the patron can enter the details of their fantasy roster into the application.

In step 509, the process involves retrieving cost information for the population of sports players. For example, the application can obtain information from the third party fantasy system for each sports player associated with each fantasy contest. The population of sports players can comprise all sports players on teams that are scheduled to play during the fantasy contest time window or that are under consideration for the fantasy contest. As a non-limiting example, the application can retrieve cost information for all NBA players on teams scheduled to play on a Thursday night. As another example, the application can obtain cost information for all NFL football players playing during a week of football that are not on a bye week. It should be appreciated that costs for sports players can change from fantasy contest to fantasy contest, and the application can retrieve cost information for each such fantasy contest. For example, LeBron James may cost $12,000 in one fantasy contest, while costing $12,500 in another and the application can ensure the cost corresponding to the fantasy contest is utilized.

In step 512, the process involves identifying one or more sports players on the patron's roster that is inactive for the sporting event. The sporting event can be a specific sports game under consideration in the fantasy contest. For example, the application can determine that a sports player's status changed from questionable to out for a sporting event for a sports player is on the patron's roster. The application can obtain data to determine that a sports player's status has changed by querying various third party sites, such as NFL.com or bleacherreport.com; querying third party data sources; querying sports betting systems; monitoring social media such as Twitter, Tumbler, Google Plus, Instagram, LinkedIn, and Facebook; monitoring news feeds, such as team news feeds; having an employee monitor sports player changes and entering said changes into the system; and other methods of obtaining current sports player status. The application can also identify a sports player that decides to not play, has a family event arise, such as having a baby or having a family member pass away, or any other circumstance that can cause a sports player to be inactive for a sporting event.

In step 515, the process involves generating alternative sports player options for a patron's roster. For example, the application can evaluate the cost or salary of the identified inactive sports player and determine a replacement sports player with a similar salary that fits within the patron's salary cap. As a non-limiting example, if the patron has spent their entire salary cap for a specific fantasy sports event, and LeBron James becomes inactive and James is in the patron's starting lineup with a cost of $12,000, the system can recommend starting Anthony Davis for $12,000 or Stephen Curry for $11,500 instead of LeBron James, but would not recommend starting James Harden for $12,200 because James Harden's cost would exceed the patrons salary cap for that specific fantasy sports event. The application can optimize spending on sports players by recommending cost appropriate players. Further, in the above example, the application can prioritize recommending Anthony David and Stephen Curry over recommending Paul George with a cost of $3,000 because starting Paul George in place of LeBron James would leave the patron with $9,000 in salary cap space remaining, which would not be optimal. The application can also factor in which fantasy sports event is under consideration, for example, if Anthony Davis was $12,200 for a prior fantasy sports event and $12,500 for a subsequent fantasy sports event, the application can still recommend him based on the cost for this particular fantasy sports event. In addition, if the patron also starts LeBron James in the subsequent fantasy sports event in which LeBron James cost is $12,100, the application would not recommend Anthony David because his cost is $12,500, which is above the cost of LeBron, unless the patron had additional cap space available. The application can also consider position of the sports player slot that the inactive sports player is occupying and recommend only sports players that fit within that slot. In the above example, if LeBron James is occupying a roster position designated as SF, then the application would not recommend Anthony Davis because Davis plays PF and therefore would not be eligible for that roster position.

In step 518, the process involves transmitting a notification to the patron that the sports player will be inactive for the sporting event, the notification including options for alternative sports players available to the patron. For example, when the application identifies a sports player is inactive, such as in step 512, and generates alternative player options, such as in step 515, the application can transmit a notification to the patron of the sports player's inactivity and include the generating alternative players. The transmission can be sent via text message, email, via social media, or push notification, among other delivery methods. In addition, the transmission can be sent immediately upon identifying the inactivity, sent periodically, or sent within a fixed period prior to the start of the inactive sports player's sporting event. In some embodiments, the notification is transmitted immediately upon determining that the player is inactive. In other embodiments, the application sends bulk notifications to all patrons a fixed time period from the start of a sporting event, such as 10 minutes, 1 hour, or 1 day prior to the start of the sporting event.

In step 521, the process involves receiving a selection of one of the options from the patron. For example, the application can receive a selection from the patron of one of the transmitted sports player alternatives. In one embodiment, the application transmits a text message with identifiers corresponding to each alternative and receives a text message back from the patron including one of the identifiers. The identifier can comprise a letter, number, symbol, or phrase. In other embodiments, the application can transmit an email to the patron including a series of links, and the patron can select an alternative option by selecting one of the links, where each link corresponds to a different option. In yet another embodiment, the notification can include a link to a website corresponding with the application and the patron can login and enter the selection into the website.

In some embodiments, the application can include an option for the patron to enter configuration data. The configuration data can comprise patron preferences for what to do if a sports player is inactive, and the patron does not respond. For example, a patron can specify that when a sports player in their roster is identified as being inactive, the application should drop the sports player from the patron's roster and add a substitute sports player to the patron's roster without user interaction, referred to herein as automatic substitution, according to various preferred attributes referred to as alternative player preferences. The alternative player preferences can comprise the sports player with the highest cost that fits within the patron's salary cap, the sports player with the lowest or highest variance of fantasy points per game depending on the patrons risk aversion, a sports player replacing the inactive player, a sports player that plays for one of the patrons favorite or preferred teams, and/or a sports player playing against a team with a bad record of defense. In some embodiments, a patron can specify a weight associated with each alternative player preference. For example, the patron can specify that the recommendations or automatic substitutions should be based 60% on optimizing use of the salary cap, 30% based on selecting a volatile player or player with a high variance of fantasy points per game, and 10% on a sports player that plays for one of several teams designated by the patron as favorite teams. In this embodiment, the application can score each of the available sports players that qualify for the sports player slot in the patrons roster for each of the designated factors, generate a weighted overall score based at least in part on the patron's specified weighs, and generate the options for recommending or determine the automatic substitution based at least in part on the weighted overall score.

In some embodiments, the patron can specify the values using other scales. For example, the patron can specify an importance rating from 1 through 5 for each of the alternative player preferences; specify an importance categorization for each alternative player preference, such as not important, a little important, important, and very important; or specify a color ranging from blue to red regarding how hot or cold the patron feels about the alternative player preference. It can be appreciated that the patron specified alternative player preferences can be utilized in formulating recommendations, such as in step 515, as well as determining automatic substitutions. In some embodiments, the application can order the recommended sports players transmitted in the notification, and if the patron fails to respond prior to the start of the sporting event, the application can substitute the highest ranked recommended player without user interaction. It should also be appreciated that a patron may receive the notification, agree with the top ranked recommended alternative sports player, and intentionally not respond knowing the application will make the substitution.

In step 524, the process involves removing the inactive sports player from the patron's roster, for example dropping the inactive sports player, and adding an alternative sports player to the patron's roster. For example, the application can connect to the fantasy site utilizing patron supplied credentials, such as those supplied in step 503, and drop the inactive sports player from the patron's roster. The application can also utilize permissions to access a smart phone app to add/drop respective sports players. Further, the application can use an application programming interface if one is available for a fantasy site. The application can add the alternative sports player to the patron's roster for the corresponding fantasy contest. It can be appreciated that adding the player to a patron's roster for the corresponding fantasy contest may have no effect on prior or subsequent fantasy contests because the patron's roster can be selected separately from the population of sports players for each fantasy contest without regard to past or present rosters. In some embodiments, the application can add the alternative sports player chosen by the patron, such as in step 521, while in other embodiments, the application can add the highest ranked alternative sports player without user interaction. As discussed herein, the ranking can be based on user supplied preferences.

The application can also transmit a notification to the patron informing the patron that the substitution has successfully completed. If a substitution fails, the application can notify the patron of the failure and the need for the patron to perform the substitution themselves. In some embodiments, the application can escalate the notification methodology used. For example, if the application has been communicating with the patron via text messages, the application can initiate an automated phone call to inform the patron of the failure to ensure the patron does not dismiss the notification as spam or unimportant.

Figure 6:
FIG. 6 illustrates an example notification dialog according to various example embodiments.

Turning now to FIG. 6, shown is a sample dialog 600 of the notification system and process described herein on an example patron's cellular phone according to various embodiments. In the sample dialog 600, a patron can receive a sports player inactive message 603 from the application. The sports player inactive message 603 can include one or more options for alternative sports player substitutions, for example three options. As a non-limiting example, the application can determine that Derrick Rose, who has a salary of $9,400, tore his ACL while walking to the kitchen, and that Chris Paul with a cost of $9,200; Damian Lillard with a cost of $8,700; and Ricky Rubio with a cost of $8,200 are available for replacement within the patron's salary cap. In this example, the application can generate a notification including identifiers for each player, such as 1 for Chris Paul, 2 for Damian Lillard, and 3 for Ricky Rubio. A patron can respond to the message with a selection, such as message 606. In the above non-limiting example, the patron can respond with a number 1 through 3 to choose a substitute placer, such as messaging 1 to indicate that Derrick Rose should be removed from the patron's roster and that Chris Paul should be added to the patron's roster in Derrick Rose's place. In some cases the patron may respond with an invalid message and the application can message indicating the selection was invalid and the repeat the selection options. In some embodiments, the responsive message can include additional directions for what is an acceptable response. The application can also send a confirmation message to the patron informing them the transaction is complete, such as message 609. The message can also include the amount of salary cap space the patron has remaining after the transaction is complete, the current roster after the substitution is complete, and information regarding the games of the sports players on the roster, such as the start time of one or more of the games or scores for any sports players that have already played.

Figure 7:
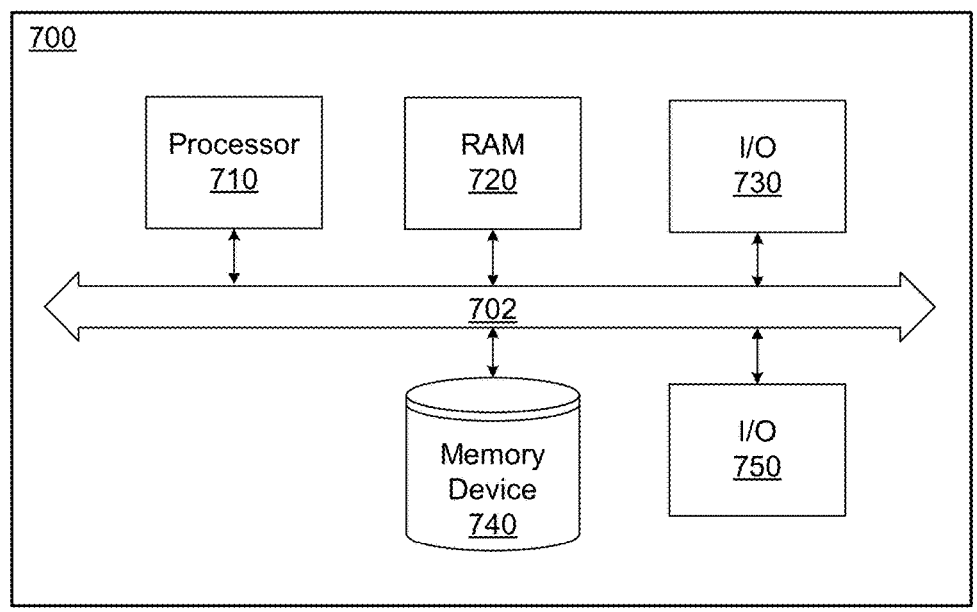
FIG. 7 is a schematic block diagram that illustrates an example computing environment according to various embodiments.

FIG. 7 illustrates an example schematic block diagram of a computing architecture 700 that may be employed to implement the functionality of FIGS. 4 and 5. The computing architecture 700 may be embodied, in part, using one or more elements of a specific purpose processing circuit or computing device. The computing architecture 700 includes a processor 710, a random access memory (RAM) 720, a Read Only Memory (ROM) 720, a memory device 740, and an Input Output (I/O) interface 750. The elements of computing architecture 700 are communicatively coupled via one or more local interfaces 702. The elements of the computing architecture 700 are not intended to be limiting in nature, as the architecture may omit elements or include additional or alternative elements.

In various embodiments, the processor 710 may include or be embodied as a general purpose arithmetic processor, a state machine, or an ASIC, for example. The processor 710 may include one or more circuits, one or more microprocessors, ASICs, dedicated hardware, or any combination thereof. In certain aspects and embodiments, the processor 710 is configured to execute one or more software modules which may be stored, for example, on the memory device 740.

The RAM and ROM 720 and 730 may include or be embodied as any random access and read only memory devices that store computer-readable instructions to be executed by the processor 710. The memory device 740 stores computer-readable instructions thereon that, when executed by the processor 710, direct the processor 710 to execute various aspects of the embodiments described herein.

As a non-limiting example group, the memory device 740 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 750 includes device input and output interfaces, such as keyboard, pointing device, display, communication, and/or other interfaces. The one or more local interfaces 702 electrically and communicatively couples the processor 710, the RAM 720, the ROM 730, the memory device 740, and the I/O interface 750 so that data and instructions may be communicated among them.

The connectivity systems disclosed herein can be used to extend high definition video and audio signals, IR, and power at a long distance, for example of up to 164 ft/50 m, over a single Cat5e/6 cable. The POUTP Technology transmits power over Cat5e/6, allowing either the transmitter extending device 120 or receiver extender device 130 to be powered without the use of a power supply. No EDID or EQ adjustments are necessary as the units autonomously adjust for compatibility and gain. This extender set can also feature a newly redesigned slim and compact chassis for easy and flexible installations. The extenders can support DTS-HD and Dolby TrueHD audio formats, and can be HDCP compliant. The extenders can support bidirectional IR pass-through for source or display control. The transmitter extending device 120 can be used to capture the HDMI input with IR signals and carry the signals via one cost effective Cat5e/6 cable. The receiver extender device 130 can be used for equalizing the transmitted HDMI signal and reconstructing IR signals.

The processor 710 is configured to retrieve computer-readable instructions and data stored on the memory device 740, the RAM 720, the ROM 730, and/or other storage means and copy the computer-readable instructions to the RAM 720 or the ROM 730 for execution, for example. The processor 710 is further configured to execute the computer-readable instructions to implement various aspects and features of the embodiments described herein. In embodiments where the processor 710 includes a state machine or ASIC, the processor 710 may include internal memory and registers for maintenance of data being processed.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:

code that obtains information for a fantasy sports event from a fantasy sports system, the information comprising a plurality of costs individually corresponding to a plurality of sports players, a roster of sports players for a patron, and a salary cap for the roster of sports players;

code that identifies a sports player of the roster of sports players as being inactive for a particular sporting event;

code that identifies a second sports player from the plurality of sports players that is excluded from the roster of sports players, a corresponding cost of the second sports player being at or below a corresponding cost of the sports player; and code that, in response to identifying the second sports player, removes the sports player from the roster of sports players in the fantasy sports system and adds the second sports player to the roster of sports players in the fantasy sports system;

wherein the program further comprises:

code that, after completion of the fantasy sports event, obtains additional information for a second fantasy sports event from the fantasy sports system, the additional information comprising a plurality of second costs individually corresponding to the plurality of sports players, a second roster of sports players for the patron, and a second salary cap for the second roster of sports players;

code that identifies a third sports player of the second roster of sports players as being inactive for a second particular sporting event;

code that identifies a fourth sports player from the plurality of sports players that is excluded from the second roster of sports players, a corresponding second cost of the fourth sports player being at or below a corresponding second cost of the third sports player; and code that, in response to identifying the fourth sports player, removes the third sports player from the second roster of sports players in the fantasy sports system and adds the fourth sports player to the second roster of sports players in the fantasy sports system.

2. The non-transitory computer-readable medium of claim 1, wherein the program further comprises code that obtains credentials for a fantasy sports system.

3. The non-transitory computer-readable medium of claim 1, wherein the program further comprises code that obtains permission from the patron to access an application on a smart phone.

4. The non-transitory computer-readable medium of claim 1, wherein the program further comprises:

code that transmits a notification to the patron, the notification comprising a plurality of options regarding available sports players; and code that receives a selection of the second player of the plurality of options from the patron.

5. The non-transitory computer-readable medium of claim 1, wherein the program further comprises code that, in response to removing the sports player from the roster and adding the second sports player to the roster, transmits a confirmation to the patron indicating successful substitution of the sports player with the second sports player.

6. The non-transitory computer-readable medium of claim 5, wherein the confirmation comprises at least one of a remaining balance of the salary cap for the roster, a list of current sports players on the roster of sports players, a start time of at least one sporting event, or a score for a completed sporting event in which a sports player of the roster of sports players competed.

7. A system, comprising:

at least one computing device; and at least one application executed in the at least one computing device, the at least one application comprising:

logic that obtains information from a fantasy sports system, the information comprising a plurality of costs individually corresponding to a plurality of sports players, a roster of sports players for a patron, and a salary cap for the roster of sports players;

logic that identifies a sports player of the roster of sports players as being inactive for a particular sporting event;

logic that identifies a second sports player from the plurality of sports players that is excluded from the roster of sports players, wherein a corresponding cost of the second sports player being at or below a corresponding cost of the sports player; and logic that, in response to identifying the second sports player, removes the sports player from the roster of sports players in the fantasy sports system and adds the second sports player to the roster of sports players in the fantasy sports system;

wherein the application further comprises:

logic that, after completion of the fantasy sports event, obtains additional information for a second fantasy sports event from the fantasy sports system, the additional information comprising a plurality of second costs individually corresponding to the plurality of sports players, a second roster of sports players for the patron, and a second salary cap for the second roster of sports players;

logic that identifies a third sports player of the second roster of sports players as being inactive for a second particular sporting event;

logic that identifies a fourth sports player from the plurality of sports players that is excluded from the second roster of sports players, a corresponding second cost of the fourth sports player being at or below a corresponding second cost of the third sports player; and logic that, in response to identifying the fourth sports player, removes the third sports player from the second roster of sports players in the fantasy sports system and adds the fourth sports player to the second roster of sports players in the fantasy sports system.

8. The system of claim 7, wherein the at least one application further comprises logic that obtains credentials for a fantasy sports system.

9. The system of claim 7, wherein the at least one application further comprises logic that obtains permission from the patron to access an application on a smart phone.

10. The system of claim 7, wherein the at least one application further comprises:

logic that transmits a notification to the patron, the notification comprising a plurality of options regarding available sports players; and logic that receives a selection of the second player of the plurality of options from the patron.

11. The system of claim 7, wherein the at least one application further comprises logic that, in response to removing the sports player from the roster and adding the second sports player to the roster, transmits a confirmation to the patron indicating successful substitution of the sports player with the second sports player.

12. The system of claim 11, wherein the confirmation comprises at least one of a remaining balance of the salary cap for the roster, a list of current sports players on the roster of sports players, a start time of at least one sporting event, or a score for a completed sporting event in which a sports player of the roster of sports players competed.

* * * * *